(12) United States Patent
Nevalainen et al.

(10) Patent No.: US 10,915,484 B2
(45) Date of Patent: Feb. 9, 2021

(54) PERIPHERAL DISCONNECTION SWITCH SYSTEM AND METHOD

(71) Applicant: DIGITAL 14 LLC, Abu Dhabi (AE)

(72) Inventors: Jouni Tapio Nevalainen, Li (FI); Mika Petteri Annamaa, Oulunsalo (FI); Jari Tapani Greus, Oulu (FI)

(73) Assignee: DIGITAL 14 LLC, Abu Dhabi (AE)

( * ) Notice: Subject to any disclaimer, the term of this patent is extended or adjusted under 35 U.S.C. 154(b) by 0 days.

(21) Appl. No.: 15/898,027

(22) Filed: Feb. 15, 2018

(65) Prior Publication Data

US 2018/0246832 A1 Aug. 30, 2018

Related U.S. Application Data (60) Provisional application No. 62/463,509, filed on Feb. 24, 2017.

(51) Int. Cl.
| | |
|---|---|
| *G06F 13/40* | (2006.01) |
| *G06F 21/62* | (2013.01) |
| *G06F 21/82* | (2013.01) |
| *G06F 1/3287* | (2019.01) |
| *G06F 13/12* | (2006.01) |

(52) U.S. Cl.
CPC .......... *G06F 13/409* (2013.01); *G06F 1/3287* (2013.01); *G06F 13/12* (2013.01); *G06F 13/4068* (2013.01); *G06F 21/6245* (2013.01); *G06F 21/82* (2013.01)

(58) Field of Classification Search
CPC ...... G06F 13/409; G06F 1/1684; G06F 13/12; G06F 13/4068; G06F 21/6245; G06F 21/82

USPC .......................................................... 710/32
See application file for complete search history.

(56) References Cited

U.S. PATENT DOCUMENTS

| | | | | |
|---|---|---|---|---|
| 4,048,672 A | * | 9/1977 | Seiden | G06F 13/4022 710/36 |
| 5,359,540 A | * | 10/1994 | Ortiz | G06F 1/266 700/295 |
| 5,434,562 A | * | 7/1995 | Reardon | G06F 21/567 713/193 |
| 5,708,819 A | * | 1/1998 | Dunnihoo | G06F 1/3203 713/323 |
| 5,754,881 A | * | 5/1998 | Aas | G06F 13/4022 710/2 |
| 5,787,298 A | * | 7/1998 | Broedner | G06F 1/266 710/105 |

(Continued)

FOREIGN PATENT DOCUMENTS

| | | |
|---|---|---|
| EP | 2106578 A2 | 10/2009 |
| WO | 0195069 A2 | 12/2001 |

OTHER PUBLICATIONS

On-The-Go Supplement to the USB 2.0 Specification Revision 1.0 Dec. 18, 2001 (Year: 2001).*

(Continued)

*Primary Examiner* — Paul R. Myers
(74) *Attorney, Agent, or Firm* — Zilka-Kotab, P.C.

(57) ABSTRACT

A peripheral disconnection switch system and method are provided. The system comprises at least one peripheral connected to a processor, and a hardware switch connected to the at least one peripheral. The system is operable such that engaging the hardware switch disables the at least one peripheral.

19 Claims, 12 Drawing Sheets

(56) References Cited

U.S. PATENT DOCUMENTS

| | | | | |
|---|---|---|---|---|
| 5,850,559 A * | 12/1998 | Angelo | G06F 1/26 | 713/320 |
| 6,131,134 A * | 10/2000 | Huang | G06F 13/4081 | 710/302 |
| 6,205,502 B1 * | 3/2001 | Endo | G06F 13/4068 | 710/100 |
| 6,415,342 B1 * | 7/2002 | Wahl | G06F 13/4072 | 710/100 |
| 6,604,199 B1 * | 8/2003 | Yang | G06F 1/1632 | 710/303 |
| 7,401,236 B2 * | 7/2008 | Adachi | G06F 1/26 | 713/300 |
| 8,046,756 B2 * | 10/2011 | Okutsu | G06F 9/4406 | 717/178 |
| 8,090,961 B2 | 1/2012 | Yoffe et al. | | |
| 8,522,309 B2 | 8/2013 | Yoffe et al. | | |
| 8,799,539 B2 * | 8/2014 | Lambert | G06F 13/4072 | 710/62 |
| 8,924,708 B2 | 12/2014 | Yoffe et al. | | |
| 8,996,892 B1 * | 3/2015 | Chu | G06F 1/325 | 713/300 |
| 9,483,096 B2 * | 11/2016 | Bhuiyan | G06F 1/266 | |
| 9,667,254 B2 * | 5/2017 | Lin | G06F 13/385 | |
| 2003/0042554 A1 * | 3/2003 | Honmura | G06F 15/7842 | 257/393 |
| 2003/0154338 A1 * | 8/2003 | Boz | G06F 13/4081 | 710/303 |
| 2003/0221135 A1 * | 11/2003 | Motoe | G06F 1/266 | 713/300 |
| 2006/0022988 A1 * | 2/2006 | Soroushi | G06F 1/30 | 345/564 |
| 2006/0136646 A1 * | 6/2006 | Do | H04W 8/005 | 710/304 |
| 2006/0248257 A1 * | 11/2006 | Kojima | G06F 1/266 | 710/316 |
| 2008/0126589 A1 * | 5/2008 | Husain | G06F 3/023 | 710/14 |
| 2009/0144571 A1 * | 6/2009 | Tatsumi | G06F 1/26 | 713/320 |
| 2009/0282276 A1 * | 11/2009 | Learmonth | G06F 1/266 | 713/320 |
| 2010/0185884 A1 * | 7/2010 | Chen | G06F 1/266 | 713/321 |
| 2011/0066870 A1 * | 3/2011 | Chen | G06F 1/3203 | 713/324 |
| 2011/0109371 A1 * | 5/2011 | Kastl | G06F 1/3203 | 327/427 |
| 2012/0278598 A1 * | 11/2012 | Wang | G06F 21/575 | 713/2 |
| 2013/0050084 A1 * | 2/2013 | Soffer | G06F 3/023 | 345/163 |
| 2014/0015673 A1 * | 1/2014 | Soffer | G06F 13/4068 | 340/568.1 |
| 2017/0040838 A1 * | 2/2017 | Huang | H02J 9/066 | |

OTHER PUBLICATIONS

International Search Report and Written Opinion for International Application No. PCT/IB2018/051165, dated May 17, 2018.

Todori, Z., "Hard, Not Soft, Kill Switches," Purism, Sep. 21, 2015, pp. 1-8, as retrieved from https://puri.sm/posts/hard-soft-kill-switches/.

* cited by examiner

PERIPHERAL DISCONNECTION SWITCH SYSTEM AND METHOD

RELATED APPLICATION(S)

This application claims the benefit of U.S. Provisional Patent Application No. 62/463,509 filed Feb. 24, 2017, the entire contents of which are incorporated herein by reference.

FIELD OF THE INVENTION

The present invention relates to computing devices having integrated peripherals, and more particularly to disabling peripherals integrated with a computing device.

BACKGROUND

Most computing devices on the market include integrated peripherals. For example, many laptop computers, tablets, mobile phones, printers, etc. are manufactured to include at least one peripheral as an integrated hardware component. Integration means that the peripheral is built into the computing device. The peripherals may include a microphone, an audio speaker, a camera, a Bluetooth transceiver, Wi-Fi transceiver, or other antenna, etc.

Typically, integrated peripherals remain communicatively connected to other hardware components of the computing device, by virtue of their integration with the computing device. For example, a bus connecting the peripheral and the other hardware components of the computing device, such as memory, a processor, etc., may enable such constant communication.

However, there may be instances where it is desirable to disable at least some peripherals of the computing device. There is thus a need for addressing these and/or other issues associated with the prior art.

SUMMARY

A peripheral disconnection switch system and method are provided. The system comprises at least one peripheral connected to a processor, and a hardware switch connected to the at least one peripheral. The system is operable such that engaging the hardware switch disables the at least one peripheral.

DETAILED DESCRIPTION

Figure 1A:
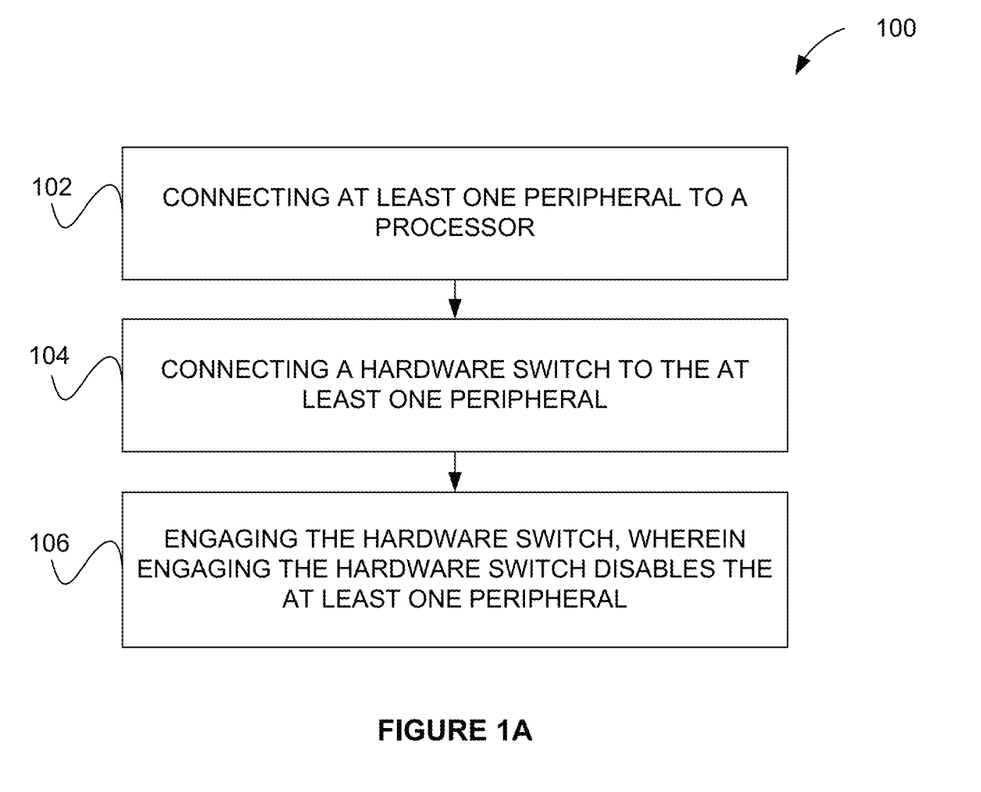
FIG. 1A illustrates a method for engaging a hardware switch, in accordance with one embodiment.

FIG. 1A illustrates a method 100 for engaging a hardware switch, in accordance with one embodiment. In operation 102, at least one peripheral is connected to a processor. In the context of the present description, a peripheral includes any auxiliary device capable of being (e.g. electrically) connected in some manner to the processor. For example, a peripheral may include a speaker, an earpiece, a headphone, a microphone, a camera, a global navigation satellite system (GNSS), a Global Positioning System (GPS), a cellular RF, wi-fi functionality, and/or bluetooth functionality. For purposes of this description, although a peripheral may be described in a singular sense, a plurality of peripherals may be connected to the processor, each of which may include a separate hardware switch. In an alternative embodiment, multiple peripherals may be connected to the processor, and groups of peripherals may include a hardware switch. For example, if a group had a common signal (e.g. supply voltage, etc.) used for several peripherals, one hardware switch (e.g. analog switch, etc.) could be used to disable the group of several peripherals.

In operation 104, a hardware switch is (e.g. electrically or mechanically) connected to the at least one peripheral. In use, the hardware switch may include a user operable switch. The hardware switch may be used to directly affect electrical signals between the at least one peripheral and the processor. As such, the electrical signals can be directly controlled by the hardware switch (rather than by software). This may be especially pertinent where the software (e.g. in the processor, etc.) is tainted by malware. Having the ability to directly affect connecting a peripheral and a processor allows the device and the data to remain more secure.

As indicated in operation 106, the hardware switch is engaged, where engaging the hardware switch disables the at least one peripheral. Such condition may include the hardware switch causing a disconnect of a circuit line between the at least one peripheral and the processor. Alternatively, the hardware switch may be further connected to a general-purpose input/output (GPIO), the GPIO being configured such that the GPIO generates an interrupt.

Further, the engagement may terminate one or more signals from the processor to the at least one peripheral. In one embodiment, it may be ensured that the termination of the one or more signals is proper. For example, in the case of an analog microphone, if the analog switch disconnects the supply voltage line of the microphone and leaves the regulator output without a connection, the regulator might become unstable. In another example, with respect to a camera peripheral, a low active reset line may be high when the analog switch is opened. As such, on the camera side, the signal may remain high without a connection to pull the signal back down low, resulting in a camera reset that may not be complete. As such, it may be beneficial to ensure that termination of the one or more signals is proper.

In use, the engagement may include a time delay. For example, the time delay may include an output falling edge occurring after an input falling edge. A falling edge may include a signal change state from a logical high to a logical low. As an example, when a hardware switch is not activated, a timer and GPIO input signal may be in a logical high level. Additionally, when the hardware switch is activated, the timer and GPIO input signal may be in a logical low level. At such a point of time, the processor (e.g. SoC, etc.) may receive information about the hardware switch usage, and the processor may direct software to switch off the peripherals in software. After the time required for safe software shutdown of the peripherals (e.g. Tdelay, etc.), the physical signal lines in hardware level may then be safely disconnected. If a Tdelay (i.e. delay circuit) were not implemented, the software may subsequently not function the next time the hardware switch is activated (e.g. when a camera is turned back on, etc.).

Additionally, the hardware switch may be connected to an analog switch. In one embodiment, an analog switch may control the signal line of the peripheral. When such a signal line is disconnected, the peripheral may not be enabled and thus protected from potential risk (e.g. malware). Where several peripherals are present, several signal lines may need to be disconnected. As such, a need may exist to have several analog switches that are controlled by one end user operable hardware switch. Additionally, as another example, the hardware switch may be added to a reset line associated with the at least one peripheral.

One benefit of method 100 is that the at least one peripheral may remain operational even after the engagement of the hardware switch. For example, a wireless processor may be connected to a system on a chip (SoC) and the hardware switch may be located between the wireless processor and an antenna. In such a configuration, the hardware switch may be engaged which may prevent the wireless processor from receiving data. Nonetheless, the wireless processor may remain operational. One benefit of allowing the peripheral to remain operational is that it may more quickly function once the hardware switch connects it back to the processor. For example, if a wireless processor remained operational but was disconnected from its antenna, reconnecting the wireless processor to its antenna could allow it to function and operate (i.e. get connected to the wireless network) faster than if it were to be fully restarted and then be reconnected.

Figure 1B:
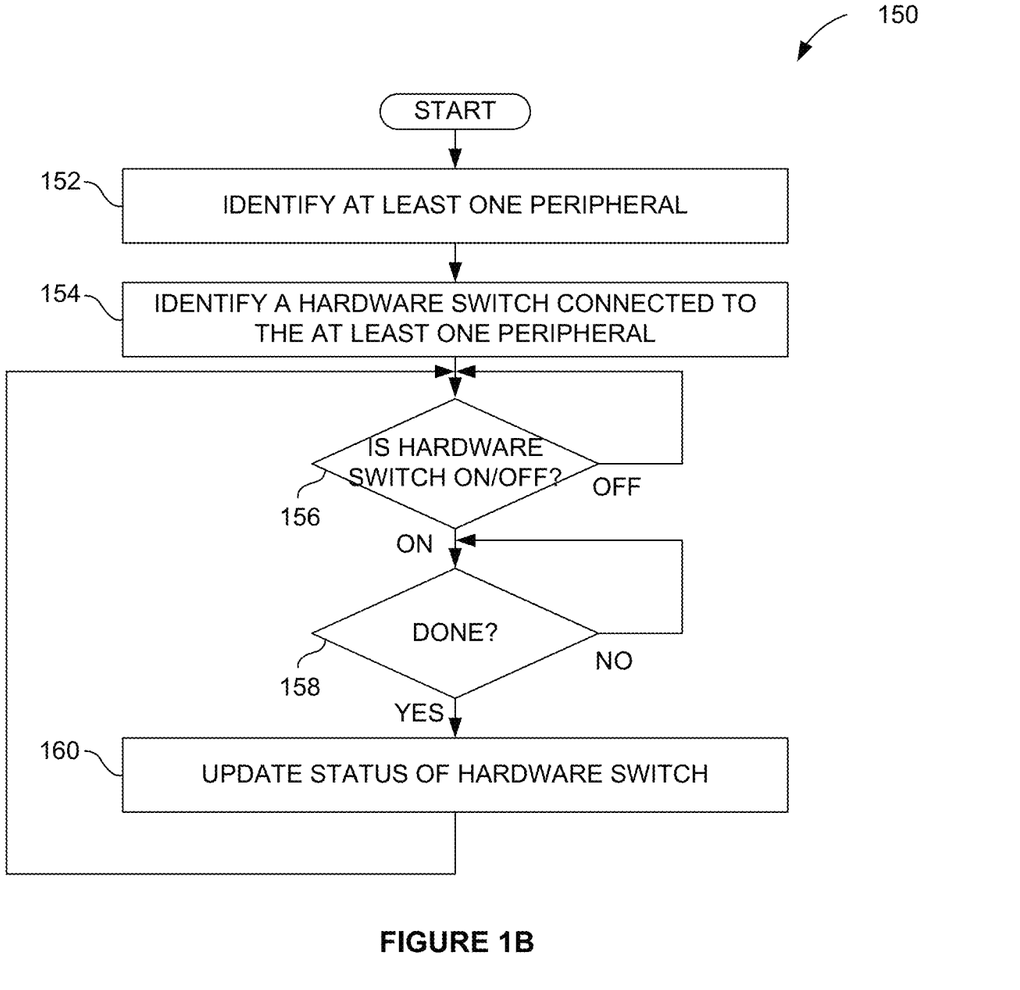
FIG. 1B illustrates a method for working with a hardware switch, in accordance with one embodiment.

FIG. 1B illustrates a method 150 for working with a hardware switch, in accordance with one embodiment. As an option, the method 150 may be implemented in the context of any one or more of the embodiments set forth in any previous and/or subsequent figure(s) and/or description thereof. However, it is to be appreciated that the method 150 may be implemented in the context of any desired environment.

As shown, operation 152 includes identifying at least one peripheral. The identification may occur during the boot-up sequence (e.g. status check of connected devices, etc.), or at any point after the boot-up sequence (e.g. a camera device is connected after boot-up, etc.). Per operation 154, a hardware switch connected to the at least one peripheral is identified. In one embodiment, the hardware switch may be associated with more than one peripheral (e.g. a grouping of peripherals, etc.).

Next, it is determined per decision 156 if the hardware switch is on or off. If the switch is off, then the peripheral may remain in contact with the processor. If the hardware switch has been enabled, however, then the peripheral (or grouping of peripherals) may be physically not connected to the processor. In one embodiment (not shown in method 150), if the hardware switch is turned on, a status associated with the hardware switch may be updated with the processor. In this manner, the processor keeps an up to date record of the status of the hardware switches associated with the peripheral(s).

In decision 158 it is determined whether the hardware switch is switched back off. If it is determined that the hardware switch has been turned off (i.e. the peripheral may now connect to the processor, etc.), then the method proceeds to operation 160 where the status of the hardware switch is updated. For example, if the hardware switch has been turned off, then the processor may update its registry to account for the hardware switch being turned off.

More illustrative information will now be set forth regarding various optional architectures and uses in which the foregoing method may or may not be implemented, per the desires of the user. It should be noted that the following information is set forth for illustrative purposes and should not be construed as limiting in any manner. Any of the following features may be optionally incorporated with or without the exclusion of other features described.

Figure 2:
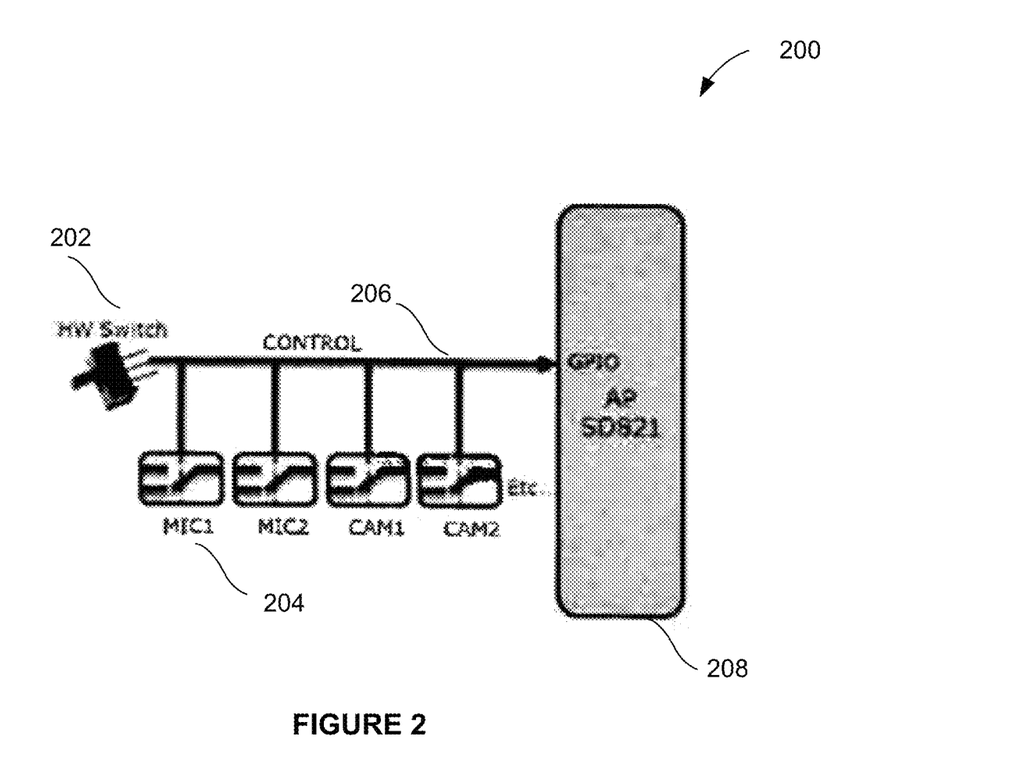
FIG. 2 illustrates a system for engaging a hardware switch, in accordance with one embodiment.

FIG. 2 illustrates a system 200 for engaging a hardware switch, in accordance with one embodiment. As an option, the system 200 may be implemented in the context of any one or more of the embodiments set forth in any previous and/or subsequent figure(s) and/or description thereof. However, it is to be appreciated that the system 200 may be implemented in the context of any desired environment.

As shown, system 200 includes a hardware switch 202, peripherals 204 (e.g. MIC1, MIC2, CAM1, CAM2, etc.) a data bus 206 (e.g. CONTROL, etc.), and a SoC 208 (e.g. SD821, etc.). The hardware switch 202 may be engaged to disable the recording, connectivity, and/or functionality of any of the peripheral devices 204. In one embodiment, for controlled disabling of any of the peripheral devices 204, enabling the hardware switch 202 may be known in software before implementation. For example, it may be beneficial to stop the signal to the peripheral by software (e.g. in the processor, etc.) before stopping the signal in hardware (i.e. a Tdelay may also be appropriate).

In one embodiment, each of the peripheral devices having a separate hardware switch. Of course, as indicated herein, the peripheral devices may be grouped together with at least one hardware switch applied to the grouping(s). Additionally, although an analog switch may be connected to the hardware switch, the analog switch may be independent of the processor (e.g. SoC). In this context, a physical switch may ground a circuit line associated with a GPIO (i.e. the physical switch may be independent of software written to control the switch, etc.). In one operation, a GPIO of a processor (e.g. SoC, etc.) may function as an input, and listen to a state of the hardware switch. If there is malware detected in the processor (e.g. SoC, etc.), the GPIO may be configured to function as output and high, such that peripherals remain not disabled. In such an example, circuitry may be engineered such that it is not controlled by an AP (e.g. SoC, etc.).

Figure 3:
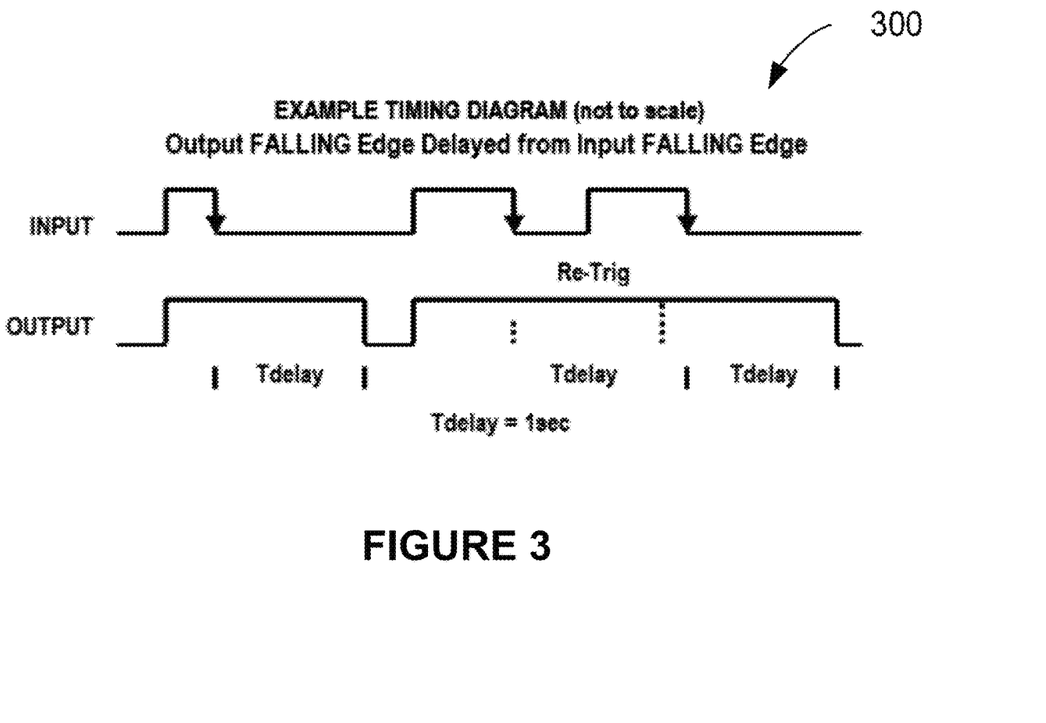
FIG. 3 illustrates a timing diagram, in accordance with one embodiment.

FIG. 3 illustrates a timing diagram 300, in accordance with one embodiment. As an option, the timing diagram 300 may be implemented in the context of any one or more of the embodiments set forth in any previous and/or subsequent figure(s) and/or description thereof. However, it is to be appreciated that the timing diagram 300 may be implemented in the context of any desired environment.

As shown, the output includes a Tdelay, which is the time period between the input being received and the output responding. As described hereinabove, such a Tdelay may ensure that termination of signals by software occurs before a hardware termination, such that the termination is proper.

Additionally, the timing diagram 300 shows an output falling edge being delayed from an input falling edge.

Figure 4:
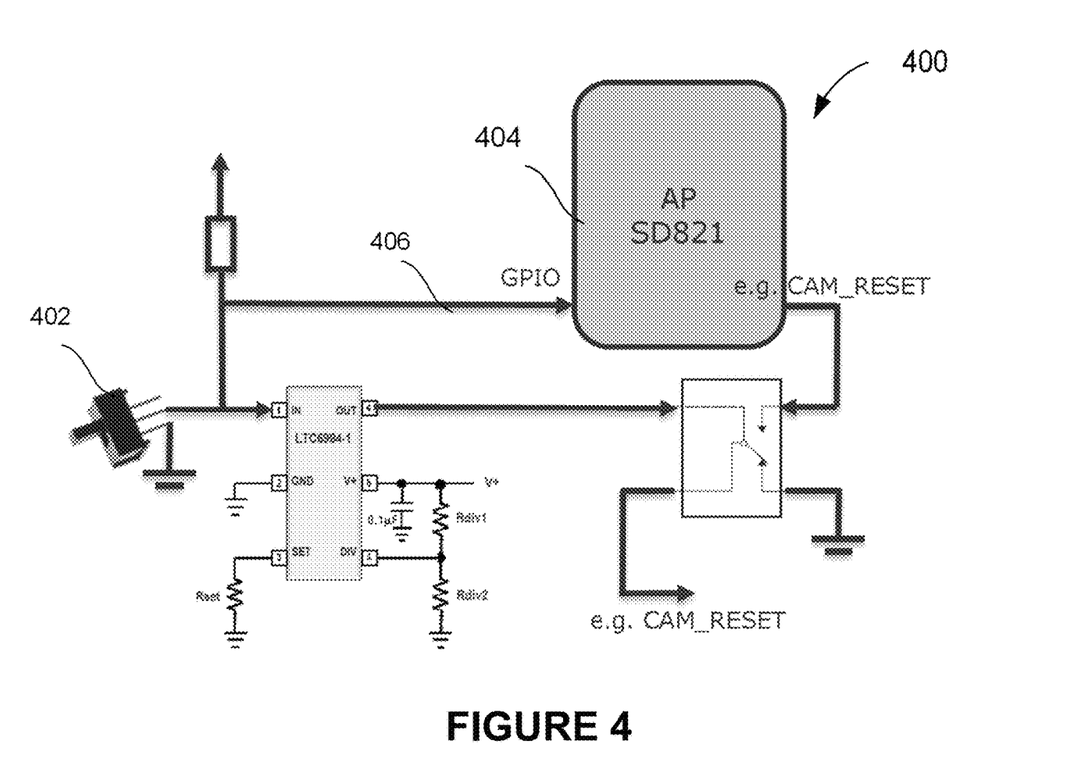
FIG. 4 illustrates a system for engaging a hardware switch, in accordance with one embodiment.

FIG. 4 illustrates a system 400 for engaging a hardware switch, in accordance with one embodiment. As an option, the system 400 may be implemented in the context of any one or more of the embodiments set forth in any previous and/or subsequent figure(s) and/or description thereof. For example, the system 400 may reflect various steps of operations of the method 100 of FIG. 1. However, it is to be appreciated that the system 400 may be implemented in the context of any desired environment.

As shown, the hardware switch 402 may be grounded. Additionally, the hardware switch 402 may be connected to both a processor 404 (e.g. SD821, etc.) via a GPIO 406. A camera reset (e.g. CAM_RESET, etc.) may also be connected to the processor 404. In one embodiment, the hardware switch 402 may ground the GPIO line (as shown). Additionally, enabling the hardware switch 402 located on the camera reset may prevent the camera from recording and/or sampling images. However, as discussed herein, in such an example, the camera may still nonetheless retain some operability.

Figure 5:
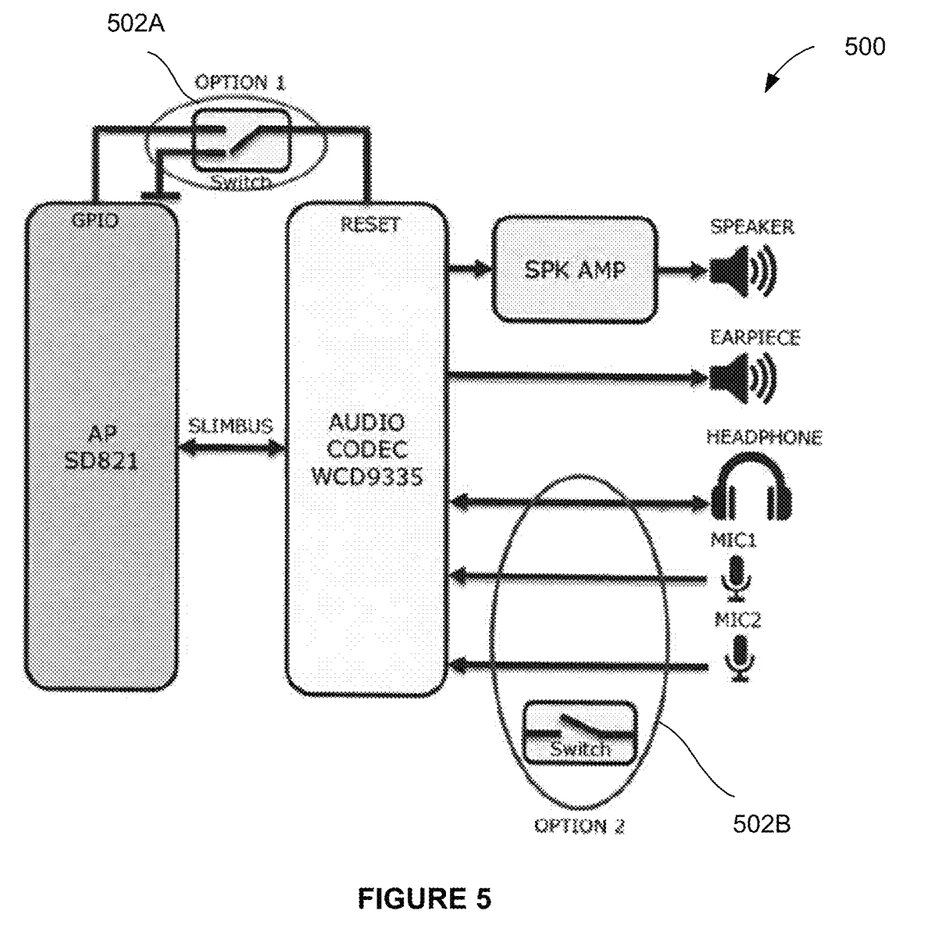
FIG. 5 illustrates a system for engaging a hardware switch for audio, in accordance with one embodiment.

FIG. 5 illustrates a system 500 for engaging a hardware switch for audio, in accordance with one embodiment. As an option, the system 500 may be implemented in the context of any one or more of the embodiments set forth in any previous and/or subsequent figure(s) and/or description thereof. For example, the system 500 may reflect various steps of operations of the method 100 of FIG. 1. However, it is to be appreciated that the system 500 may be implemented in the context of any desired environment.

As shown, the hardware switch 502A for audio may be located on the audio processor reset line (shown as OPTION 1). For example, adding a switch to the audio reset line (e.g. shown as the switch associated with AUDIO CODEC WCD9335, etc.) may cause the audio codec processor to remain in reset mode even though the processor (e.g. AP SD821) may send signals to enable and/or use the audio processor.

As a second option, the hardware switch 502B may be added directly to the peripheral line. For example, if the hardware switch were intended to disable at least one microphone, the hardware switch may be added directly to a microphone line. Such a hardware switch may be added to a digital microphone's clock or supply voltage line, or to an analog microphone's supply voltage line. Of course, in such a scenario, it may be beneficial to properly terminate any of the signals coming from or going to the audio processor (e.g. AUDIO CODEC WCD9335, etc.).

Figure 6:
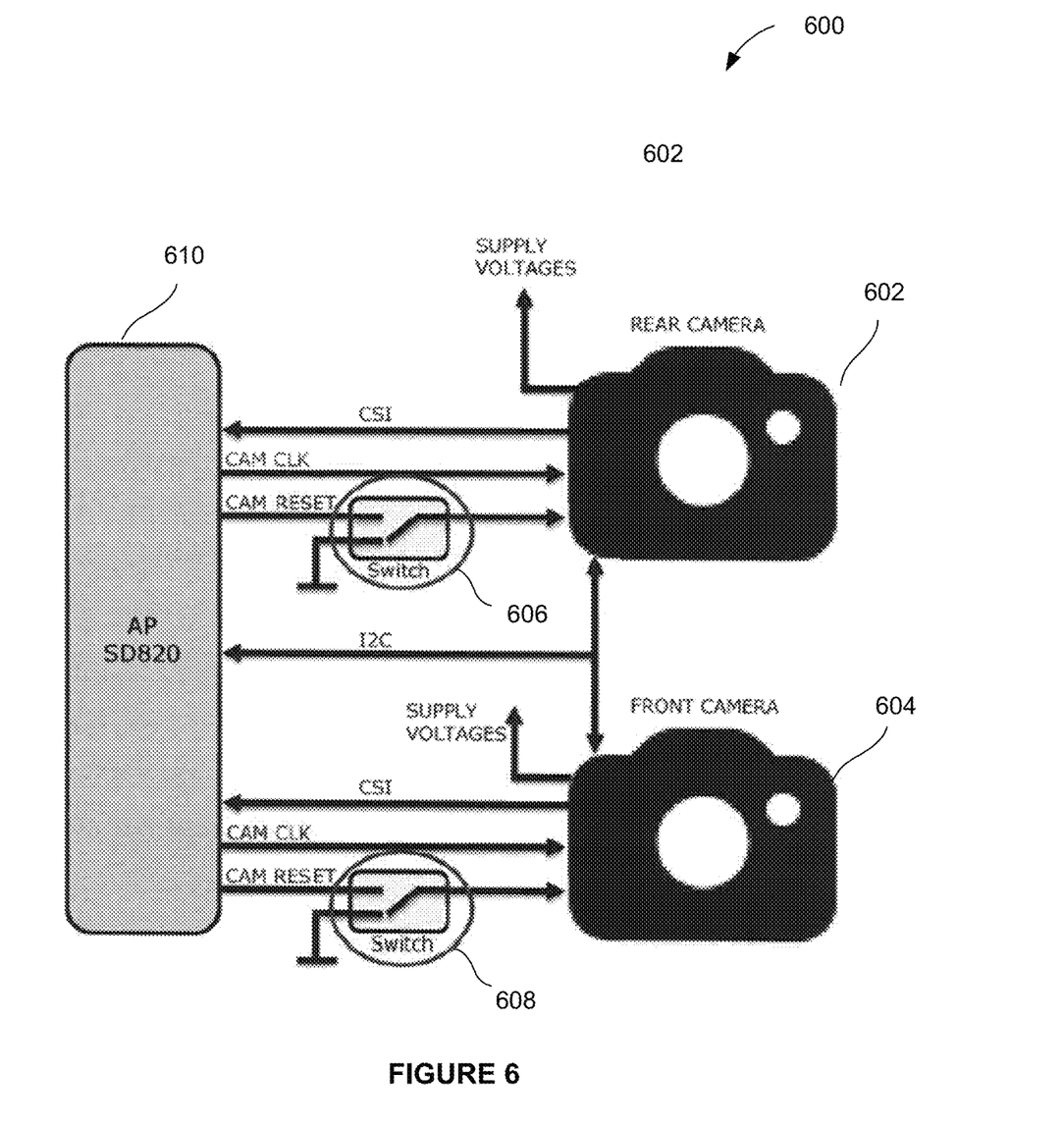
FIG. 6 illustrates a system for engaging a hardware switch for cameras, in accordance with one embodiment.

FIG. 6 illustrates a system 600 for engaging a hardware switch for cameras, in accordance with one embodiment. As an option, the system 600 may be implemented in the context of any one or more of the embodiments set forth in any previous and/or subsequent figure(s) and/or description thereof. For example, the system 600 may reflect various steps of operations of the method 100 of FIG. 1. However, it is to be appreciated that the system 600 may be implemented in the context of any desired environment.

As shown, the system 600 includes a rear camera 602, a front camera 604, a hardware switch 606 associated with the rear camera, a hardware switch 608 associated with the front camera, a camera serial interface (CSI) for each of the rear camera and front camera, a clock (e.g. CAM CLK) for each of the rear camera and front camera, a reset line (e.g. CAM RESET) for each of the rear camera and front camera, a supply voltage for each of the rear camera and front camera, and/or a processor 610 (AP SD820, etc.). In one embodiment, the rear camera and front camera may be connected. Additionally, an I2C standard bus may also be used to connect the rear and/or front cameras 602, 604 to the processor 610.

In such a configuration, a hardware switch 606, 608 may be located on the reset line for each for each of the rear camera 602 and front camera 604. In use, the cameras (front and rear 602, 604) may be controlled via the hardware switch 606, 608. Additionally, when enabling the hardware switch 606, 608, data from either of the front or rear camera 602, 604 may be prevented from being sent to the processor 610, but the cameras 602, 604 may otherwise retain operability.

Figure 7:
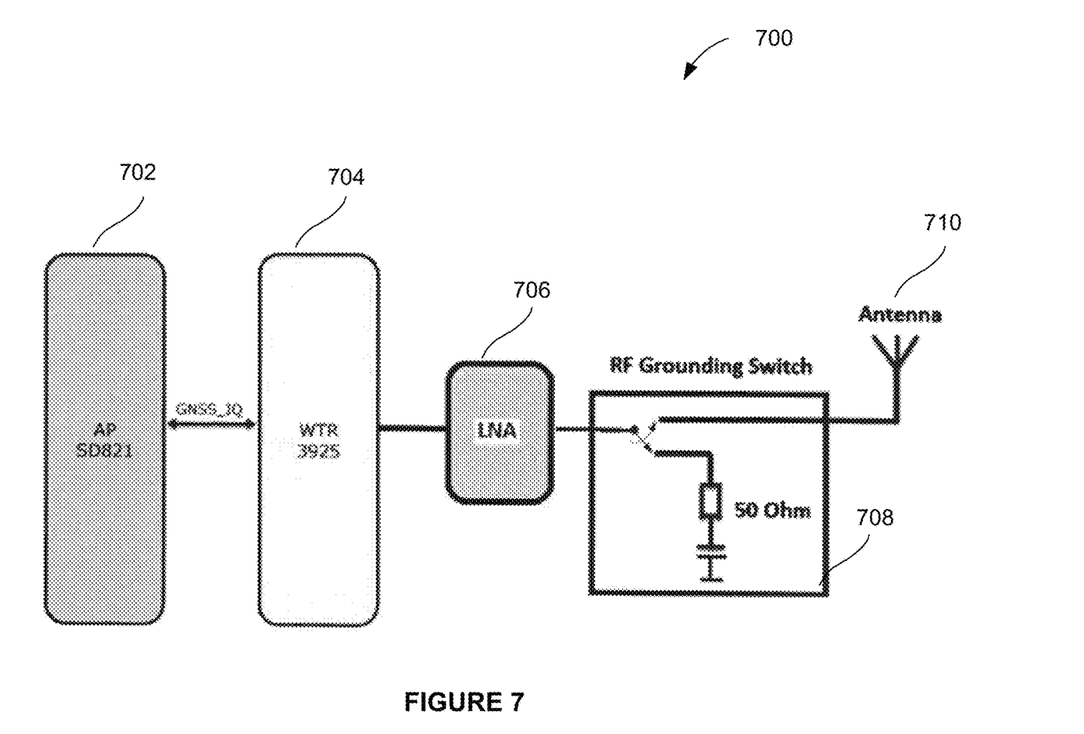
FIG. 7 illustrates a system for engaging a hardware switch, in accordance with one embodiment.

FIG. 7 illustrates a system 700 for engaging a hardware switch, in accordance with one embodiment. As an option, the system 700 may be implemented in the context of any one or more of the embodiments set forth in any previous and/or subsequent figure(s) and/or description thereof. For example, the system 700 may reflect various steps of operations of the method 100 of FIG. 1. However, it is to be appreciated that the system 700 may be implemented in the context of any desired environment.

As shown, the processor 702 (e.g. AP SD8921) is connected to a RF transceiver 704 (e.g. WTR3925, etc.) which is connected to a low noise amplifier 706 which is then connected to a hardware switch 708, which is then connected to an antenna 710. In one embodiment, the RF transceiver 704 may include a GNSS and/or GPS functionality. In such a configuration, the system 700 may remain operational but the GPS location may not be obtained due to the antenna 710 being disabled (i.e. due to the hardware switch 708 being engaged). Of course, as described elsewhere, it may be beneficial to properly terminate any of the signals going to or from the antenna 710. The hardware switch 708, as shown in system 700, may include a RF grounding switch.

Figure 8:
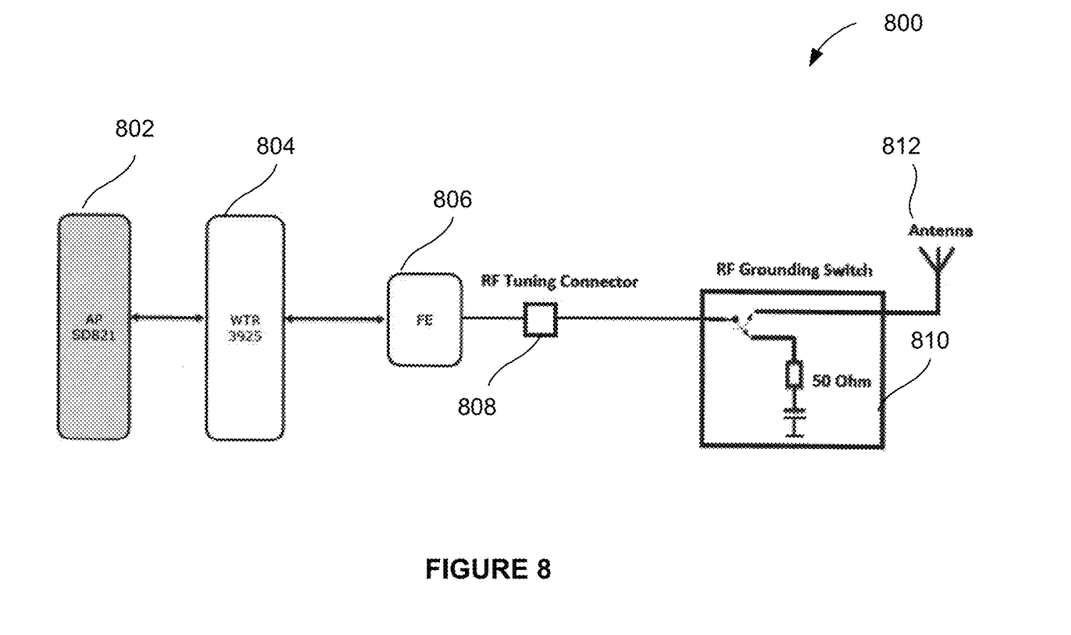
FIG. 8 illustrates a system for engaging a hardware switch for cellular RF, in accordance with one embodiment.

FIG. 8 illustrates a system 800 for engaging a hardware switch for cellular RF, in accordance with one embodiment. As an option, the system 800 may be implemented in the context of any one or more of the embodiments set forth in any previous and/or subsequent figure(s) and/or description thereof. For example, the system 800 may reflect various steps of operations of the method 100 of FIG. 1. However, it is to be appreciated that the system 800 may be implemented in the context of any desired environment.

As shown, the system 800 may include a processor 802 (e.g. AP SD821, etc.), a RF transceiver 804 (e.g. WTR3925, etc.), a RF front end 806 (e.g. FE, etc.), a tuning connector 808 (e.g. RF Tuning Connector, etc.), a grounding switch 810, and an antenna 812. As with system 700 of FIG. 7, engaging the hardware switch 810 in system 800 may cause the antenna 812 to be disabled. In one embodiment, system 800 may include a RF grounding switch through a 50 ohm resistor.

Figure 9:
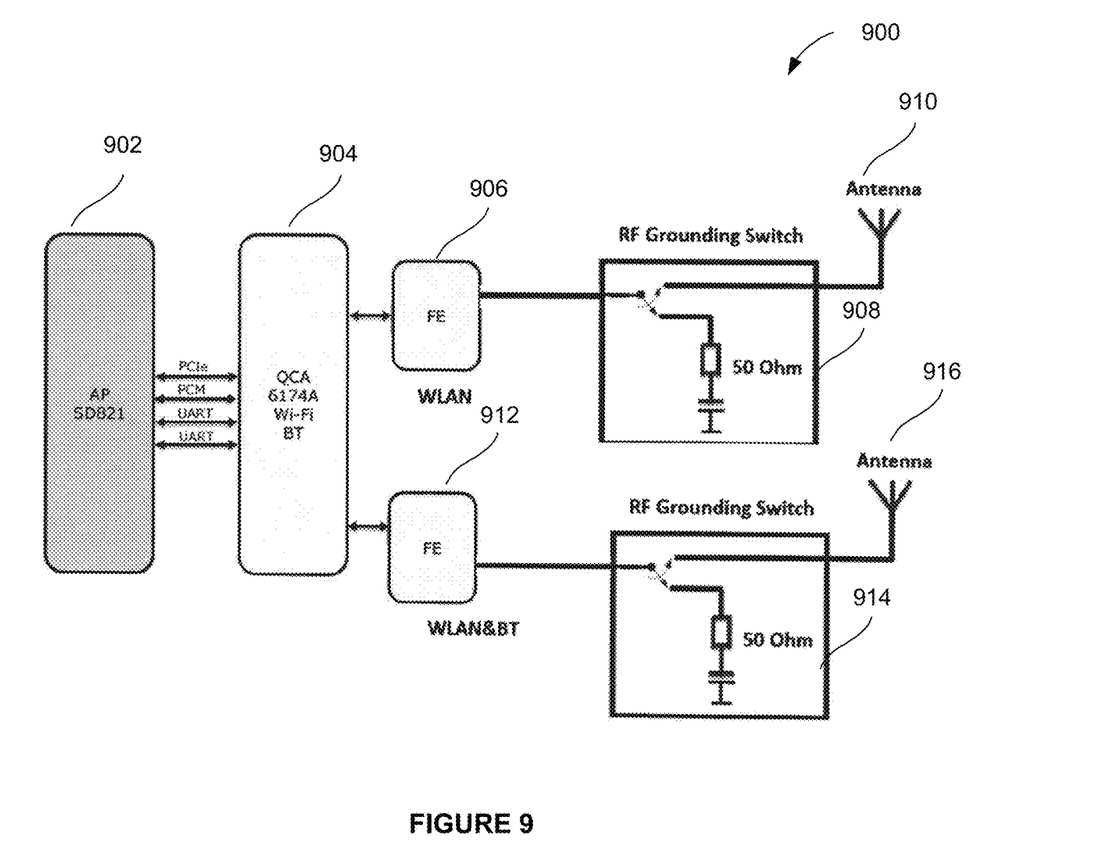
FIG. 9 illustrates a system for engaging a hardware switch for WiFi and Bluetooth transmission, in accordance with one embodiment.

FIG. 9 illustrates a system 900 for engaging a hardware switch for WiFi and Bluetooth transmission, in accordance with one embodiment. As an option, the system 900 may be implemented in the context of any one or more of the embodiments set forth in any previous and/or subsequent figure(s) and/or description thereof. For example, the system 900 may reflect various steps of operations of the method 100 of FIG. 1. However, it is to be appreciated that the system 900 may be implemented in the context of any desired environment.

As shown, system 900 may include a processor 902 (e.g. AP SD821, etc.), a WiFi/Bluetooth (BT) chip 904 (e.g. QCA 6174A, etc.), a WLAN front end 906, and WLAN&BT front end 912, a hardware switch 908, 914 (e.g. RF Grounding Switch, etc.) for both the WLAN 906, and for the WLAN&BT 912, and an antenna 910, 916 attached to each of the hardware switch 908, 914. In such a configuration, the hardware switch 908, 914 may include a RF grounding switch through a 50 ohm resistor. As with the system 700 of FIG. 7 and the system 800 of FIG. 8, engaging the hardware switch 908, 914 in system 900 may cause the corresponding antenna 910, 916 to be disabled. The Wi-Fi and Bluetooth chip would remain operational, but communication would be prevented due to the antenna 910, 916 being disabled. Of course, as described elsewhere, it may be beneficial to properly terminate any of the signals going to or from the antenna 910, 916.

In various embodiments, a hardware switch may be used to ensure privacy of the device. For example, the hardware switch may be used to stop transmission using a wireless chip, or to halt capture using a camera. Additionally, a hardware switch may prevent a device from being eavesdropped, spied on, recorded, and/or tracked. In some instances, such actions may be taken to preserve the integrity of the device (e.g. prevent malware from being received by the device, etc.). In other instances, if it is determined that transmission of data is being intercepted, the privacy of the data can be maintained by immediately stopping the transmission (via the hardware switch). Further, if a sensor or peripheral (auxiliary device) associated with the device is found to be compromised in any manner, a hardware switch can be used to remove external functionality to such sensor or peripheral.

Figure 10:
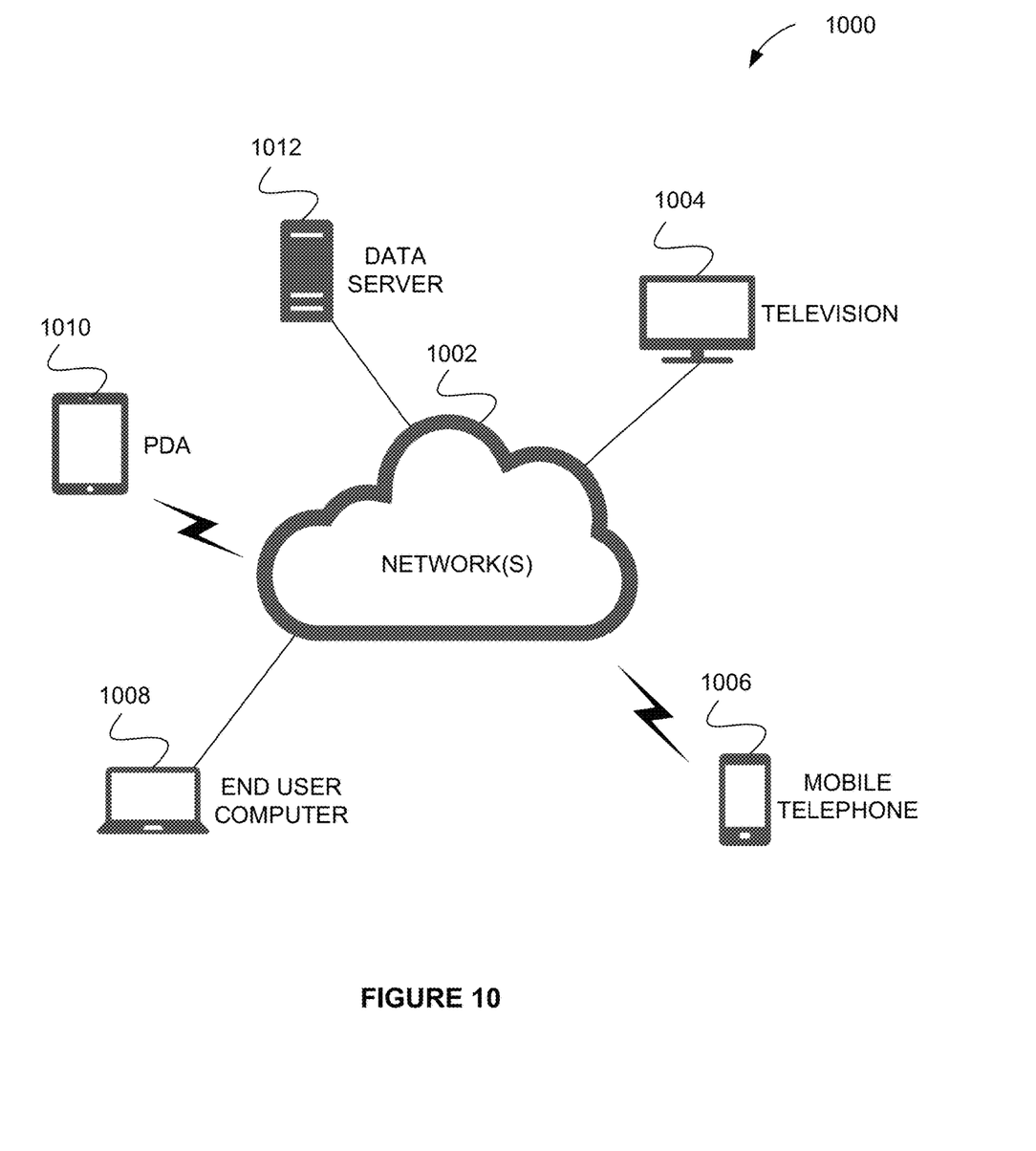
FIG. 10 illustrates a network architecture, in accordance with one embodiment.

FIG. 10 illustrates a network architecture 1000, in accordance with one embodiment. As shown, at least one network 1002 is provided. In the context of the present network architecture 1000, the network 1002 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1002 may be provided.

Coupled to the network 1002 is a plurality of devices. For example, a server computer 1012 and an end user computer 1008 may be coupled to the network 1002 for communication purposes. Such end user computer 1008 may include a desktop computer, lap-top computer, and/or any other type of logic. Still yet, various other devices may be coupled to the network 1002 including a personal digital assistant (PDA) device 1010, a mobile phone device 1006, a television 1004, etc.

Figure 11:
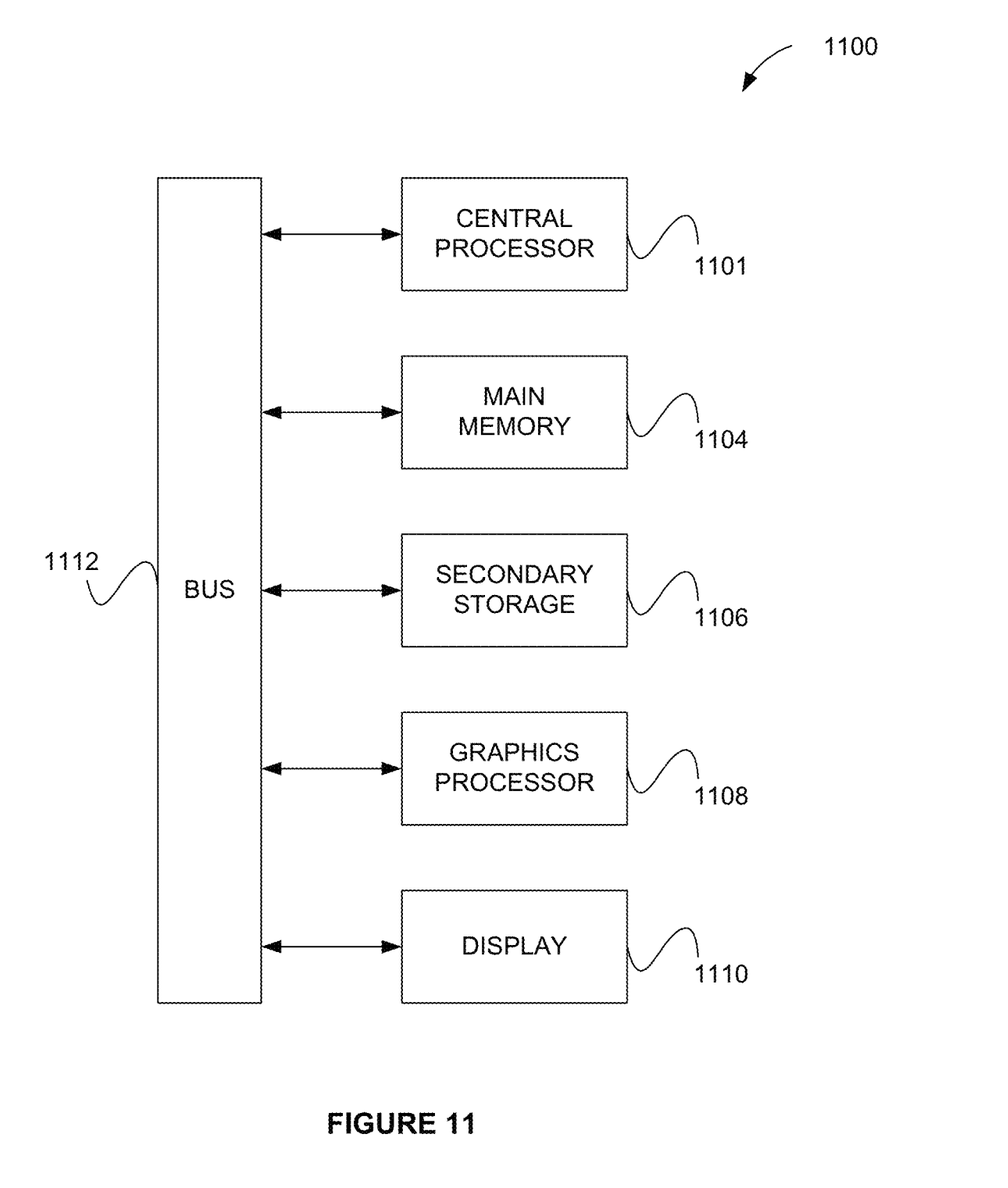
FIG. 11 illustrates an exemplary system, in accordance with one embodiment.

FIG. 11 illustrates an exemplary system 1100, in accordance with one embodiment. As an option, the system 1100 may be implemented in the context of any of the devices of the network architecture 1000 of FIG. 10. However, it is to be appreciated that the system 1100 may be implemented in any desired environment.

As shown, a system 1100 is provided including at least one central processor 1102 which is connected to a bus 1112. The system 1100 also includes main memory 1104 [e.g., hard disk drive, solid state drive, random access memory (RAM), etc.]. The system 1100 also includes a graphics processor 1108 and a display 1110.

The system 1100 may also include a secondary storage 1106. The secondary storage 1106 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1104, the secondary storage 1106, and/or any other memory, for that matter. Such computer programs, when executed, enable the system 1100 to perform various functions (as set forth above, for example). Memory 1104, secondary storage 1106 and/or any other storage are possible examples of non-transitory computer-readable media.

In one embodiment, means, in accordance with the structures described above, are provided to: connect at least one peripheral to a processor; connect a hardware switch to the at least one peripheral; and engaging the hardware switch, where engaging the hardware switch disables the at least one peripheral.

Optionally, in any of the preceding embodiments, the hardware switch causes a disconnect of a circuit line between the at least one peripheral and the processor.

Optionally, in any of the preceding embodiments, the hardware switch is further connected to a general-purpose input/output (GPIO), the GPIO being configured such that the GPIO generates an interrupt.

Optionally, in any of the preceding embodiments, the at least one peripheral includes at least one of a speaker, an earpiece, a headphone, a microphone, a camera, a global navigation satellite system (GNSS), a Global Positioning System (GPS), a cellular RF, wi-fi functionality, and bluetooth functionality.

Optionally, in any of the preceding embodiments, the engagement occurs based on a time delay. As a further option, the time delay includes an output falling edge occurring after an input falling edge.

Optionally, in any of the preceding embodiments, the hardware switch is connected to an analog switch.

Optionally, in any of the preceding embodiments, the hardware switch is added to a reset line associated with the at least one peripheral.

Optionally, in any of the preceding embodiments, the engagement terminates one or more signals from the processor to the at least one peripheral. As a further option, the termination of the one or more signals is proper.

Optionally, in any of the preceding embodiments, the at least one peripheral remains operational even after the engagement.

Optionally, in any of the preceding embodiments, the hardware switch is a user operable switch.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system, comprising:
   a processor;
   at least one peripheral connected to the processor;
   a hardware switch situated between the processor and the at least one peripheral; and
   a delay circuit that implements a time delay to cause the at least one peripheral to be disabled after the time delay when the hardware switch is engaged to disconnect a circuit line between the at least one peripheral and the processor.

2. The system of claim 1, wherein the hardware switch causes the disconnect of the circuit line between the at least one peripheral and the processor.

3. The system of claim 1, wherein the hardware switch is further connected to a general-purpose input/output (GPIO), the GPIO being configured such that the GPIO generates an interrupt.

4. The system of claim 1, wherein the at least one peripheral includes at least one of a speaker, an earpiece, a headphone, a microphone, a camera, a global navigation satellite system (GNSS), a Global Positioning System (GPS), a cellular RF, wi-fi functionality, and bluetooth functionality.

5. The system of claim 1, wherein the time delay includes an output falling edge occurring after an input falling edge.

6. The system of claim 1, wherein the hardware switch is connected to an analog switch.

7. The system of claim 1, wherein the hardware switch is added to a reset line associated with the at least one peripheral.

8. The system of claim 1, wherein the engagement terminates one or more signals from the processor to the at least one peripheral.

9. The system of claim 8, wherein the termination of the one or more signals is proper.

10. The system of claim 1, wherein the at least one peripheral remains operational even after the engagement.

11. The system of claim 1, wherein the hardware switch is a user operable switch.

12. The system of claim 1, wherein responsive to engagement of the hardware switch, the system causes the processor to direct software to switch off the peripherals in the software during the time delay, and wherein after the time delay one or more physical signal lines to the at least one peripheral are disconnected.

13. A method, comprising:
connecting at least one peripheral to a processor;
connecting a hardware switch between the processor and the at least one peripheral; and
engaging the hardware switch to disconnect a circuit line between the at least one peripheral and the processor, wherein engaging the hardware switch causes the at least one peripheral to be disabled after a time delay, and wherein the time delay is implemented using a delay circuit.

14. The method of claim 13, wherein the hardware switch causes the disconnect of the circuit line between the at least one peripheral and the processor.

15. The method of claim 13, wherein the hardware switch is further connected to a general-purpose input/output (GPIO), the GPIO being configured such that the GPIO generates an interrupt.

16. The method of claim 13, wherein the at least one peripheral includes at least one of a speaker, an earpiece, a headphone, a microphone, a camera, a global navigation satellite system (GNSS), a Global Positioning System (GPS), a cellular RF, wi-fi functionality, and bluetooth functionality.

17. The method of claim 13, wherein the time delay includes an output falling edge occurring after an input falling edge.

18. The method of claim 13, wherein the hardware switch is connected to an analog switch.

19. The method of claim 13, wherein the hardware switch is added to a reset line associated with the at least one peripheral.

* * * * *